United States Patent Office 3,260,699
Patented July 12, 1966

3,260,699
PROCESS FOR MAKING ORGANOPOLY-
SILOXANES
Gustav A. Schmidt, Malvern, Pa., assignor to General Electric Company, a corporation of New York
No Drawing. Filed Mar. 15, 1963, Ser. No. 265,366
3 Claims. (Cl. 260—46.5)

The present invention relates to an improved method for making organopolysiloxanes useful in insulating coating applications. More particularly, the present invention relates to a method for making organopolysiloxane hydrolyzates by passing steam into a mixture of alkoxylated korganosilanes.

One of the principal obstacles in manufacturing organopolysiloxane resins involving the hydrolysis of organohalosilane mixtures having a ratio of from about 1 to 1.6 organo radicals per silicon atom is the premature gelation of products resulting from the hydrolysis of the more highly reactive organohalosilane components of the mixture such as methyltrichlorosilane. Premature gelation of organopolysiloxane hydrolyzate is undesirable because the gel is insoluble in organic solvents and it has little utility.

One method that can be employed to minimize gel formation of organopolysiloxane hydrolyzate is to partially alkoxylate the organohalosilane before it is completely hydrolyzed so as to control the rate of the hydrolysis of the organohalosilane. For example, a mixture of organohalosilanes having a ratio of from 1 to 1.6 organo radicals per silicon atom can be introduced into a mixture of alcohol and water along with an organic solvent such as toluene, while agitating the mixture. Although this procedure markedly decreases the rate at which organohalosilanes hydrolyze due to the formation of alkoxy chain-stopping radicals, either on the silane or organopolysiloxane hydrolyzate, substantial gelation of the products produced from the reactive organohalosilanes often occurs in the mixture. One explanation is that the hydrolysis mixture while agitated is in the form of a multiple phase system composed of water, organic solvent, alcohol, etc. which provides for substantial and rapid interaction between silanol and halosilane at the interface of the phases.

Another method that can be employed to minimize gel formation during the hydrolysis of organohalosilanes, is effecting the hydrolysis of the various organohalosilane components in the presence of an excessive amount of an inert organic solvent. However, even though a reduction in the reaction rate of the more highly reactive organosiloxy units is achieved as a result of such high dilution, this method is undesirable because of the excessive amounts of solvents that are necessary.

A further method that can be utilized to substantially eliminate gel formation in hydrolyzing organohalosilanes is by forming a single phase system of alcohol and organohalosilanes by completely alkoxylating the organohalosilanes before the hydrolysis step. This procedure overcomes the disadvantage of hydrolyzing in a multiple phase system, and provides for a high degree of control over the rate at which the alkoxy silanes hydrolyze. However, this method is undesirable because the hydrolysis proceeds at a substantially reduced rate. It is also difficult to eliminate the alcohol from the hydrolysis mixture. In addition, substantial amounts of low molecular weight organopolysiloxane hydrolyzate are also formed.

The present invention is based on the discovery that valuable results can be achieved if steam is employed to hydrolyze a single phase mixture of alkoxy silanes having a ratio of from about 1 to 1.6 organic radicals per silicon atom. In addition, it has also been found that if steam is employed at a desirable rate, it can be employed to simultaneously effect the removal of the alcohol from the hydrolysis mixture while the organopolysiloxane hydrolyzate is forming.

In accordance with the present invention there is provided a process for making organopolysiloxane hydrolyzates which comprises (1) forming a solution of organohalosilanes and an aliphatic alcohol, where there is utilized a proportion of from at least about one mole of said aliphatic alcohol per mole of hydrolyzable halogen in said mixture, (2) effecting the removal of hydrogen halide from said mixture of (1), resulting from the reaction of said organohalosilanes and said aliphatic alcohol, (3) passing steam into the resulting mixture of (2) to provide for the separation of said aliphatic alcohol, and (4) recovering from the mixture of (3), the organopolysiloxane hydrolyzate, where the organohalosilanes utilized in said mixture of (1) have an average of from 1 to 1.6 organo radicals per silicon atom attached to silicon by carbon-silicon linkages selected from monovalent hydrocarbon radicals, halogenated monovalent hydrocarbon radicals and cyanoalkyl radicals.

The organohalosilanes that can be employed in the practice of the invention to make the organopolysiloxane hydrolyzates of the present invention are included by the formula, (1) 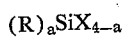  $(R)_aSiX_{4-a}$ where $a$ is a whole number equal to from 0 to 3, inclusive, R is a member selected from monovalent hydrocarbon radicals, halogenated monovalent hydrocarbon radicals and cyanoalkyl radicals, and X is a halogen radical. Organohalosilanes that can be employed in the present invention also include organohalosilanes having the formula, (2)  $(R)_3SiCH_2CH_2Si(R)_b(X)_{3-b}$ where R and X are as defined above, and $b$ is a whole number equal to from 0 to 2.

The aliphatic alcohols that can be employed with the above-described organohalosilanes in the practice of the invention include aliphatic monohydric alcohols having the formula, (3)  R′OH where R′ is a monvalent aliphatic radical having from 1 to 8 carbon atoms.

Radicals included by R of Formula 1 are aryl radicals such as phenyl, tolyl, naphthyl, etc. radicals; aralkyl radicals such as phenylethyl, benzyl, etc.; alkyl radicals such as methyl, ethyl, propyl, butyl, octyl, etc. radicals; alkenyl radicals such as vinyl, allyl, etc. radicals; cycloalkyl radicals such as cyclohexyl, cycloheptyl, etc.; and cycloalkenyl radicals, such as cyclohexenyl, cycloheptenyl, etc.; radicals included by R′ of Formula 3 are for example, alkyl radicals such as methyl, ethyl, propyl, hexyl, octyl, etc.; alkenyl radicals such as butene-1, pentene-2, etc.; R can be the same radical, or any two or more of the aforementioned radicals.

Organohalosilanes operable in the present invention as shown in Formula 1 are for example, dimethyldichlorosilane, dimethyldibromosilane, methyltribromosilane, methyltrichlorosilane, methylphenyldichlorosilane, phenyltrichlorosilane, phenyltribromosilane, trimethylchlorotrichlorosilane, phenyltrichlorosilane, silicon tetrachloride, silane, dimethylphenylchlorosilane, etc.; organohalosilanes shown by Formula 2 include for example, trimethylsilylethylenedimethylchlorosilane, phenyldimethylsilylethylenemethylphenylchlorosilane, trimethylsilylethylenetrichlorosilane, etc. Aliphatic alcohols shown by Formula 3 that are operable in the present invention include for example, methyl alcohol, ethyl alcohol, isopropyl alcohol, butyl alcohol, pentyl alcohol, octyl alcohol, allyl alcohol, etc.

In the practice of the invention, a mixture of organohalosilanes having a ratio of from about 1 to 1.6 organo radicals per silicon atom is reacted with an aliphatic alcohol. The resulting mixture is then further treated to remove excessive amounts of hydrogen halide resulting from the reaction. Steam is then introduced into the mixture to effect the removal of the aliphatic alcohol while simultaneously effecting the formation of organopolysiloxane hydrolyzate.

In forming the mixture of organohalosilanes, and the aliphatic alcohol, the order of addition of the respective components is not critical. It is preferred, however, to add the organohalosilanes to the alcohol while it is agitated. It has been found that a proportion of at least an equimolar amount of alcohol per mole of the hydrolyzable halogen present in the mixture will provide for advantageous results. In instances where the proportion of organotrihalosilane in the mixture utilized is less than about 40 mole percent, experience has shown that satisfactory results can be obtained by utilizing substantially less than about an equal molar amount of alcohol per mole of hydrolyzable halogen. However, if the proportion of reactive organohalosilanes, such as organotrihalosilane, is utilized in substantial amounts, i.e., about 40 mole percent, there should be in the mixture at least a molar equivalent of aliphatic alcohol for each mole of hydrolyzable halogen to a proportion of as high as 2 moles or more of alcohol per mole of available hydrolyzable halogen in the mixture.

Temperatures at which the mixture of organohalosilane and aliphatic alcohol is formed, i.e., during the addition period, can vary widely, subject only to the physical properties of the components utilized. A preferred procedure, for example, is to avoid exceeding a temperature of about 60° C., to prevent the premature loss of undesirable amounts of unreacted organohalosilanes by distillation.

After the addition of the organohalosilane to the alcohol has been completed, the temperature of the mixture can be raised to effect the removal of excessive amounts of hydrogen halides formed during the reaction. For example, the mixture can be refluxed until the overhead temperature is up to about 100° C. The mixture can then be cooled if desired, to determine the amount of residual hydrogen halide present, in accordance with standard titration methods. In order to avoid undesirable side reactions while steam is introduced subsequently into the mixture, experience has shown that the residual hydrogen halide should not exceed about 12% by weight of the mixture.

Steam can be introduced into the alkoxylated mixture of organohalosilanes to provide for the separation of the aliphatic alcohol from the mixture at a desirable rate. The steam temperature can vary widely, and is restricted only by the physical limitations of the facilities employed. Temperatures between 100° C. to 135° C. are preferred, while temperatures as high as 170° C., or higher, can be advantageously used. Prior to the introduction of steam, the temperature of the alkoxylated organohalosilane mixture is not critical. It is preferred, however, to have the mixture at about room temperature, so that the removal of the alcohol can be accomplished in a desirable manner. The termination of the reaction can be easily determined by the cloudy appearance of the mixture due to the separation of the organopolysiloxane hydrolyzate. The termination of the reaction is also achieved at the point at which water is continuously separated at a head temperature of about 100° C.

The organopolysiloxane hydrolyzate can easily be recovered in accordance with well known procedures of the art, such as, extraction with an inert organic solvent followed by drying and stripping procedures.

Depending upon the type of organopolysiloxane hydrolyzate and the application to which it is to be employed, various catalysts can be added to it to effect a further build-up of its molecular weight by silanol condensation. For example, metal salts such as zinc octoate, iron octoate, zinc naphthenate, etc., and various quaternary ammonium compounds such as hydroxides, alkoxides, ammonium salts, etc., also can be utilized. Subsequently, added amounts of the above catalysts such as from .01 to 1% by weight of organopolysiloxane can be added to effect the final cure of the organopolysiloxane hydrolyzate such as in coating, laminating, molding, etc., applications.

In order that those skilled in the art will be better able to practice the invention, the following examples are given by way of illustration and not by way of limitation. All parts are by weight.

Example 1

There was added to isopropyl alcohol, a chlorosilane mixture composed of 65 mole percent of methyltrichlorosilane and 35 mole percent of phenyltrichlorosilane to form a mixture in which there was a 10 mole percent excess of alcohol over the molar equivalent of hydrolyzable chlorine in the mixture. The addition of the chlorosilanes to the alcohol was completed after about an hour and fifteen minutes. The mixture was then heated to reflux for a period of three hours. The resulting mixture was then titrated and it was found that 1.64 percent of residual HCl based on the weight of the mixture remained after the reflux period. Steam, at a temperature of about 100° C., was added at a moderate rate to the mixture and the alcohol was continually separated by distillation. The introduction of steam was continued until the mixture turned a milky color, indicating that the organopolysiloxane hydrolyzate was beginning to separate. The organopolysiloxane hydrolyzate was recovered with toluene. The toluene layer was stripped to about 72% solids. To the toluene solution there was added .03 part of zinc octoate based on the weight of the resin. The mixture was refluxed for 1 hour.

A 112 glass fabric was dipped into the above resin solution and then heated for 6 minutes at 80° C. and 4 minutes at 110° C. A 12" x 12" square of the aforesaid treated fabric consisting of a plurality of treated fabric layers, which together totalled a thickness of about ⅛ inch, was heated to 175° C. for 30 minutes under 1,000 p.s.i. The resulting product was then heated at the same pressure for 16 hours at 90° C. and then heated gradually to 250° C. over an 8 hour period. A 4" x 4" square was then cut from the aforesaid laminate and tested for physical strength and electrical properties. The test procedure was conducted in accordance with Federal Specification L-P406B of September 27, 1951. Table I shows the results obtained in terms of the physical properties and electrical properties of the laminate, where "W" after Flexure indicates the warp of the fabric, "F" indicates the fill, and "Wet" after Electrical indicates after 24 hours immersion in water at 23° C.

TABLE I

| Physical (Flexure) | Electrical | Dry | Wet |
|---|---|---|---|
| W-48,500 p.s.i. F-41,000 p.s.i. | Dielectric Constant Dissipation Factor | 4.18 0.21 | 4.32 0.21 |

Example 2

A mixture of organochlorosilanes composed of 50 mole percent of methyltrichlorosilane, 35 mole percent of phenyltrichlorosilane, 10 mole percent of dimethyldichlorosilane, and about 5 mole percent of diphenyldichlorosilane was added with stirring to isopropyl alcohol. The isopropyl alcohol was utilized at a 10 mole percent excess over the total hydrolyzable chlorine contained in the resulting mixture. During the addition which lasted about 1 hour, the temperature was maintained below 60° C. The mixture was then heated to reflux over a 2 hour period. It contained about 2.9% of hydrogen chloride.

Steam, at a temperature of about 100° C., was introduced into the mixture to effect the formation of the methylphenylhydrolyzate and separation of the isopropyl alcohol. The temperature during the hydrolysis was about 85° C. which lasted for about 1 hour. The reaction product was then stripped under reduced pressure to a temperature of 115° C. The hydrolyzate was recovered in accordance with the procedure of Example 1.

*Example 3*

A mixture of 62 mole percent of methyltrichlorosilane, 24 mole percent of phenyltrichlorosilane, 4 mole percent of dimethyldichlorosilane and 10 mole percent of diphenyldichlorosilane was added to butanol which was present at a 10 mole percent excess over the available hydrolyzable chlorine in the added mixture of chlorosilanes until the residual hydrogen chloride present in the mixture was below 3%. Steam was added to the mixture at a temperature of about 100° C. The addition of steam was continued until the mixture became a milky white color which indicated that the resulting organopolysiloxane hydrolyzate had separated. The hydrolyzate was then recovered with toluene at 60% solids. There was added .03% by weight of solids in the resulting mixture of zinc octoate and the mixture was heated to about 100° C. and then allowed to cool to room temperature.

The above resin was catalyzed with .03% of triethanolamine and then applied to 112 glass fabric which was coated to about 35% pick-up. Glass plies were formed as shown in Example 1 and were pressed at 1,000 p.s.i. for 1 hour at 175° C. The resulting laminate was postcured to 250° C. The laminate had a dielectric constant of 4.0 and a flexural strength of about 43,000 p.s.i.

Based on the above results shown in the examples, those skilled in the art would know that the process of the present invention provides for an improved method for making organopolysiloxane hydrolyzates which are useful for forming a variety of organopolysiloxane resins. The organopolysiloxane resins that can be produced from the organopolysiloxane hydrolyzate made in accordance with the present invention can be utilized in a variety of applications. For example, the organopolysiloxane resins produced by the methods of the present invention can be employed in laminating applications, molding applications, can be useful as varnishes and can generally be applied to a variety of substrates as an insulating coating material.

The examples have of necessity, been directed to only a few of the very many process variables which are practicable in the process of the present invention. It should be understood however, that the process of the present invention is illustrated by both the specific examples given as well as by the detailed description of the present invention which preceded these examples.

What I claim as new and desire to secure by Letters Patent of the United States is:

1. A process which comprises (1) agitating to a temperature up to 60° C., a solution of organohalosilanes and an aliphatic monohydric alcohol, where there is utilized in said solution a proportion of said aliphatic monohydric alcohol which is sufficient to completely alkoxylate all of the hydrolyzable halogen attached to silicon by silicon-halogen bonds in said solution, (2) separating hydrogen halide from said solution of (1) resulting from the reaction of said organohalosilanes and said aliphatic monohydric alcohol until the residual concentration of hydrogen halide does not exceed 12 percent by weight of the resulting mixture, (3) passing steam into the resulting mixture of (2) to provide for the separation therefrom at a temperature in the range of between 100° C. to 170° C. of said aliphatic monohydric alcohol and (4) recovering the resulting organopolysiloxane hydrolyzate from the mixture of (3), where the organohalosilanes utilized in said mixture of (1) have an average ratio of from about 1 to about 1.6 organo radicals per silicon atom, which are attached to silicon by carbon-silicon linkages and are selected from the class consisting of monovalent hydrocarbon radicals, halogenated monovalent hydrocarbon radicals, and cyanoalkyl radicals.

2. A process in accordance with claim 1, in which the aliphatic monohydric alcohol is isopropyl alcohol.

3. A process in accordance with claim 1, in which the mixture of organohalosilanes consists essentially of methylchlorosilanes and phenylchlorosilanes.

References Cited by the Examiner
UNITED STATES PATENTS

| | | | |
|---|---|---|---|
| 2,521,673 | 9/1950 | Britton et al. | 260—46.5 |
| 2,521,678 | 9/1950 | White et al. | 260—46.5 |
| 2,556,897 | 6/1951 | Bidaud | 260—46.5 |
| 2,843,555 | 7/1958 | Berridge | 260—46.5 |
| 3,008,975 | 11/1961 | Schubert | 260—448.2 |

OTHER REFERENCES

Glasstone, Textbook of Physical Chemistry, 1942, D. Van Nostrand Co., Inc., Lancaster, Pa., pages 724–725.

LEON J. BERCOVITZ, *Primary Examiner.*

WILLIAM H. SHORT, *Examiner.*

M. I. MARQUIS, *Assistant Examiner.*